United States Patent
Griffin

(10) Patent No.: US 8,005,262 B2
(45) Date of Patent: Aug. 23, 2011

(54) SYSTEM AND METHOD FOR VIDEO OBJECT IDENTIFICATION

(76) Inventor: Hugh Griffin, Greenfield, IN (US)

( * ) Notice: Subject to any disclaimer, the term of this patent is extended or adjusted under 35 U.S.C. 154(b) by 1071 days.

(21) Appl. No.: 11/778,394

(22) Filed: Jul. 16, 2007

(65) Prior Publication Data

US 2009/0022405 A1 Jan. 22, 2009

(51) Int. Cl.
*G06K 9/00* (2006.01)
(52) U.S. Cl. ......... 382/103; 382/101; 382/199; 382/266
(58) Field of Classification Search .................. 382/103, 382/107, 109
See application file for complete search history.

(56) References Cited

U.S. PATENT DOCUMENTS

| 4,731,858 | A | 3/1988 | Grasmueller et al. |
| 4,897,719 | A | 1/1990 | Griffin |
| 5,140,646 | A | 8/1992 | Ueda |
| 6,226,401 | B1 * | 5/2001 | Yamafuji et al. ............... 382/165 |
| 6,381,366 | B1 | 4/2002 | Taycher et al. |
| 6,728,392 | B1 | 4/2004 | Joshi |
| 7,006,693 | B2 | 2/2006 | Shibuya |
| 7,209,588 | B2 * | 4/2007 | Liang et al. ................... 382/181 |
| 2005/0163382 | A1 * | 7/2005 | Herley ........................ 382/199 |
| 2005/0265605 | A1 * | 12/2005 | Nakamoto et al. ............ 382/209 |
| 2009/0022405 | A1 * | 1/2009 | Griffin ........................ 382/199 |

* cited by examiner

*Primary Examiner* — Gregory M Desire
(74) *Attorney, Agent, or Firm* — Woodard Emhardt Moriarty McNett & Henry LLP

(57) ABSTRACT

A video object identification system used to identify an object, to locate its position in the view, and to determine its angular orientation. It digitizes a field of image view and subdivides the viewed area into a grid pattern of small cells. It then encodes the angle of a tangent line segment within each cell (when present) at the boundary of objects in the view. It determines rate-of-curvature of the boundary to develop a linear signature for the object. The system breaks the linear signature into segments that can be normalized to be constant regardless of the scale of the image. It then generates identification numbers to identify the object through a mathematics process. The system utilizes pipeline processing to the point where the results are applied to a microprocessor. The microprocessor analyzes a stored image field of view in encoded format to determine object perimeter cell locations (a chaining process).

2 Claims, 9 Drawing Sheets

| SEGMENT NUMBER /121 | SEGMENT LENGTH /122 | NORMALIZED LENGTH /123 | SEGMENT TYPE /124 | ACCUMULATIVE CURVATURE /125 | EXAGGERATED CURVATURE /126 | EXAGGERATED LENGTH /127 |
|---|---|---|---|---|---|---|
| 1 | | | | | | |
| 2 | | | | | | |
| ⋮ | ⋮ | ⋮ | ⋮ | ⋮ | ⋮ | ⋮ |
| N-1 | | | | | | |
| N | | | | | | |

SUMMATION VALUES

| ■ /128 | /129 | | ■ | /131 | /132 |

NOTES:
1) THE SEGMENT NUMBER IS EQUIVALENT TO ARRAY INDEX NUMBER.
2) THE SEGMENT LENGTH IS IN NUMBER OF CELLS IN THE CHAIN OF THE SEGMENT.
3) THE NORMALIZED LENGTH IS THE SUMMATION OF THE SEGMENT LENGTHS DIVIDED BY THE NUMBER OF SEGMENT LENGTHS.
4) THE SEGMENT TYPE IS EITHER STRAIGHT, POSITIVE CURVATURE, OR NEGATIVE CURVATURE.
5) THE ACCUMULATIVE CURVATURE IS THE SUMMATION OF ALL OF THE DIFFERENTIAL ANGLE SAMPLES OF THIS SEGMENT.
6) THE EXAGGERATED CURVATURE APPLIES ONLY TO CURVATURE TYPE AND IS AS FOLLOWS:
   POSITIVE CURVATURE = (CURVATURE) X (CURVATURE)
   NEGATIVE CURVATURE = (CURVATURE) X (CURVATURE) X (CURVATURE) X (CURVATURE)
7) THE EXAGGERATED LENGTH APPLIES ONLY TO THE STRAIGHT TYPE SEGMENT. IT IS ZERO FOR CURVATURE TYPES.
   EXAGGERATED LENGTH = (SEGMENT LENGTH) X (SEGMENT LENGTH)

FIG. 9

SYSTEM AND METHOD FOR VIDEO OBJECT IDENTIFICATION

FIELD OF THE INVENTION

The present invention generally relates to object recognition. More particularly, but not exclusively, the present invention pertains to a system and method for object recognition within a video source, including perimeter detection and angle variation calculation.

BACKGROUND

Video cameras have produced images whose objects can easily be recognized by a human. However, it is a much more difficult task to recognize these same objects using a computer and electronic interface to process the electronic signals from the video camera. As a result of this difficult task, only very poor recognition requiring very time-consuming processing has been achieved. Often, computerized vision tasks are accomplished using characteristics of the image unrelated to sight (as a human would consider sight). The task of determining object shapes and orientations has been done with limited success. Most applications require very closely controlled object orientation.

It is the intent of this invention to provide computer interpretation of object shapes, locations, and orientations at high speed. Object recognition is accomplished by comparing the outline perimeter of the object to a template (stored electronic representation of an expected object). The comparison is made by the computer to determine a match. It is also the intent of this invention to permit greater variation in object orientation.

SUMMARY

Various technologies and techniques are disclosed for video object identification. A video object identification system operates to identify an object, identify its position, and determine its angular orientation. The system accepts a preprocessed digitized video input. The system encodes and normalizes the angle of a tangent line segment at the boundary of identified objects. The system then creates identification numbers to identify the object through a mathematics process, such as a formula. The system traces a perimeter to recover processed differential angles and to control the development of a linear signature sequence. The mathematics process performed creates a first number representing the length of straight segments and creates a second number representing the degree of curvature of curved segments. The combination of the two numbers provides a high probability of unique identification of an object. The numbers are compared with established numbers of a template for identification of an object. A unique feature number of an object is established for the template. This feature is located on the chained object by segment comparison and the relative angular orientation, compared to the template orientation, is then determined This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

BRIEF DESCRIPTION OF THE DRAWINGS

FIG. 9 describes the stored data for the software functions.

DESCRIPTION OF THE SPECIFIC EMBODIMENTS

Figure 1:
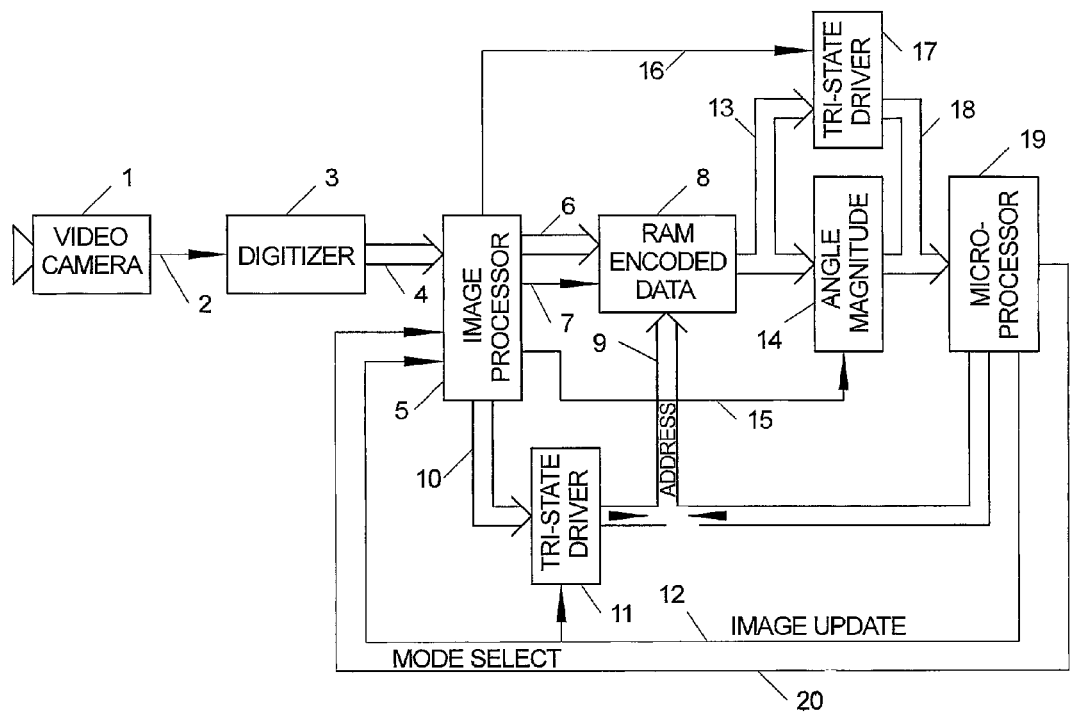
FIG. 1 illustrates the basic configuration for the object recognition processing.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further application of the principles of the invention as illustrated therein being contemplated as would normally occur to one skilled in the art to which the invention relates.

The real-time image processing described by U.S. Pat. No. 4,897,719, which is hereby incorporated by reference in its entirety, is employed to provide the encoded data further processed by this invention. The image processing for this application produces encoded data that normally defines a line segment of the image boundary. The result produces an encoded line drawing of the image scene. However, this same encoding can be utilized to define the tangent angle of this line segment. The 8-bit encoding provides information for a 4×4-pixel cell of the image scene. The line segment, or the tangent angle of this line segment, is of a single cell. The configuration of the present implementation is subdivided into 160 cells in the x-direction and 60 cells/field in the y-direction. The processing is done on a per-field basis. This produces a high-resolution processed view (grid pattern of 9600 cells) of the image scene. The processing can be done for much higher resolution cameras to provide much more detail than the present implementation. When the system control directs a new image field to be captured, this encoded field (9600 cells of data) is loaded into a random access memory (RAM) for further evaluation.

The system employs a microprocessor to trace the perimeter edges of an object and to list a string (chain) of cell locations of the cells having perimeter edges. The results of an image field stored in RAM are provided as input to the microprocessor. The microprocessor is provided control of the addressing of the RAM to access the stored data in any sequence. The microprocessor chains the outer perimeter cell locations (from random starting position and returning to this position). The encoding of data stored in RAM can be decoded to provide linkage information to adjacent cells containing this object perimeter; therefore, this task is accelerated. It may be desirable to store many object chains before going to the next task. An angle processor is also provided the stored encoded data from the RAM under address control of the microprocessor. The microprocessor can access the angle processor output when operating in a different mode of angle data processing.

An angle processor is employed to process the stored image field and to transfer the results to a microprocessor for further evaluation. The angle processor generates a number proportional to the differential angle between two cells on the image perimeter. The differential angle results are enhanced (errors reduced and accuracy improved) by providing a multiple-cell span between the two cells. The microprocessor accesses this differential angle data in the address sequence of previously chained perimeter locations. The microprocessor receives the angle results in the chained sequence to produce a linear signature of the object that can be visually recognized (by a person) as unique for an object shape. The microprocessor converts this to information it can recognize with further processing.

The microprocessor begins the recognition task by subdividing the perimeter chained data into segments (usually many) terminated by angular features. The scale of the object perimeter may vary greatly; therefore, each of the segments is normalized. Normalizing an image permits any scale image to be compared with a template (stored representation of the object). The perimeter was broken into segments to be able to normalize the segments. The next step was to convert each segment to a number(s) representation. Two numbers-per-segment was chosen. One was based upon the relative length of a straight segment and the other was based upon the curvature of the curved segments. Both numbers had the features exaggerated mathematically. Each segment exaggerated-numbers were summed to provide numbers representing an overall signature for the object. The microprocessor then performs comparison of these numbers with template numbers for object identification. The template also contains a single unique feature and angular position for that object that relates to single segment result. This segment is then located. The tangent angle of each cell of this segment can be decoded from the encoded data stored in RAM. The microprocessor can read and decode these data from the stored addresses of cells for the segment. The microprocessor then averages the angles of the object for comparison with the unique feature average angle developed on the same basis. The template orientation is known in advance. The difference in the two average angles is their relative orientation.

A dual image processing implementation will produce improved results on a per-cell basis. The image processing employed permits selection of a differential threshold of contrast differences between objects and their background. If a small threshold is used, minor contrast will cause additional edges to be detected (which increase the chaining efforts) but will permit perimeter edges to be detected even with poor contrast. When a large threshold is used, only major contrast edges will be detected (desirable much of the time) but will leave gaps in the perimeter detection where small contrast exists. A dual (threshold) processing configuration will provide the large threshold results when it is present. When the large threshold result is not present, it will provide the small threshold result. An extra output bit defines the threshold source. This permits much faster chaining with better results.

Referring in particular to FIG. 1, there is shown an implementation of the video object identification processor. Video camera 1 develops a video signal 2 that is applied to digitizer 3. Digitizer 3 develops digital data 4 that are applied to image processor 5 to produce encoded data 6 that are applied to RAM encoded data 8 storage. Signal 7 represents multiple control of write interval and output enable that are applied from image processor 5 to RAM encoded data 8. Image processor 5 also produces address data 10 that are routed through tri-state driver 11 to produce address data 9 to RAM encoded data 8 during a loading interval of encoded data 6. RAM encoded data 8 stores a field of encoded image data that is the processed image source data for microprocessor 19. Microprocessor 19 supplies image update signal 12 to both tri-state driver 11 and image processor 5 to control the loading interval of RAM encoded data 8. Image update signal 12 determines the source of address data 9 from either tri-state driver 11 or from microprocessor 19. Output data 13 from RAM encoded data 8 are applied to both tri-state driver 17 and to angle magnitude 14. The tri-state output 18 from either tri-state driver 17 or from angle magnitude 14 is applied to microprocessor 19. Mode select signal 20 developed from microprocessor 19 provides control of image processor 5 for determination of tri-state control signals 15 and 16 to determine the selection of the source of data 18. Microprocessor 19 is in the mode of chaining the perimeter of an object when data are routed through tri-state driver 17. Microprocessor 19 is in the mode of detecting differential angles for linear signature development when data are routed through angle magnitude 14.

Figure 2:
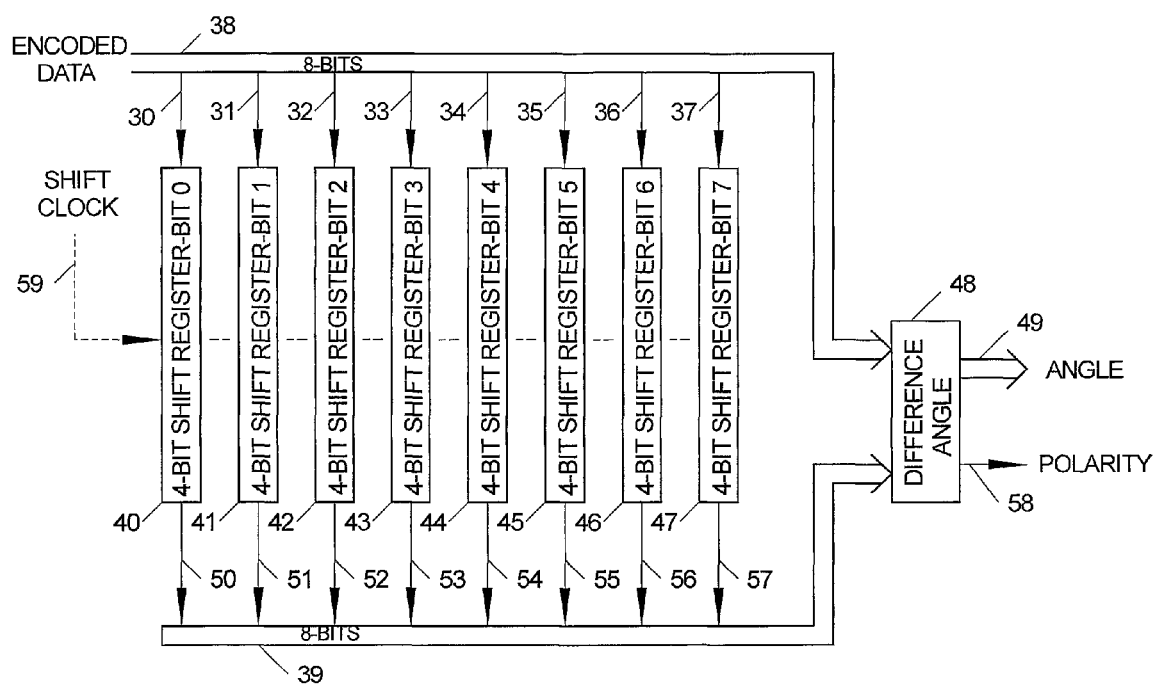
FIG. 2 shows a configuration to perform differential angle processing of the perimeter of an object.

Referring now to FIG. 2, the angle magnitude block 14 of FIG. 1 is further defined. Encoded data 38 (data 13 of FIG. 1) are eight bit data; each bit is applied to its respective 4-bit shift register 40, 41, 42, 43, 44, 45, 46, and 47. The output from each shift register produces 8-bit data 39. Each shift register produces a four-sample delay of the evaluations (of the object-perimeter angle) which is performed successively and timed by shift clock 59. This allows encoded data 38 and delayed data 39 to be applied to difference angle 48 concurrently. Difference angle 48 (implemented as a read-only-memory (ROM)) produces angle data 49 and polarity signal 58. Both data inputs 38 and 39 to difference angle 48 are encoded; output angle data 49 are a magnitude proportional to the represented physical angle difference. This ROM (difference angle 48) contains predetermined output results to all combinations of input data. The ROM can be generated (with a software program) by one skilled in the art.

Figure 3:
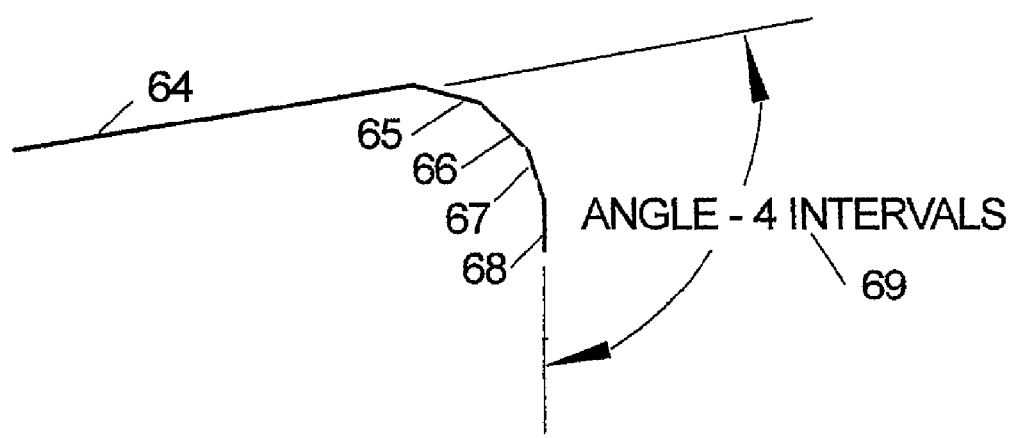
FIG. 3 illustrates the differential angle developed from two angles over a span of four samples.

Referring now to FIG. 3, the differential angle produced by the apparatus of FIG. 2 is shown. Line segment 68 is the most current sample of an object perimeter trace. Segment 67 occurs at a one sample delay, segment 66 at two sample delays, segment 65 at three sample delays, and segment 64 at four sample delays. Angle-4 intervals 69 is the differential angle magnitude of the difference between the angle of segment 68 and the angle of segment 64.

Figure 4:
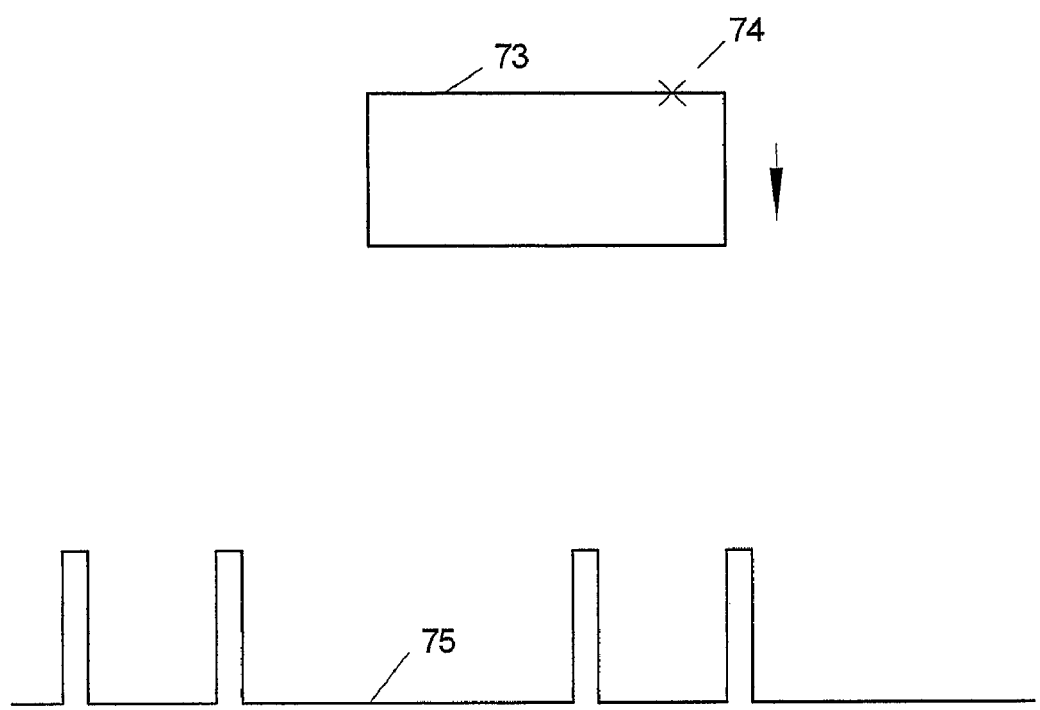
FIG. 4 illustrates the development of a linear signature for a rectangular object.

Referring now to FIG. 4, there is shown the development of a linear signature for a rectangle. Rectangle 73 has its perimeter traced beginning at arbitrary point 74 and tracing clockwise. Linear signature 75 is developed where the x-axis of the plot is the perimeter distance and the y-axis is the relative differential angle magnitude. The algebraic sum of the area under the plot is always four times the magnitude representing 360 degrees regardless of the configuration of the object. The multiplication of four is due to the spacing of four used in differential angle determination. The multiplication factor would be three if the spacing were three.

Figure 5:
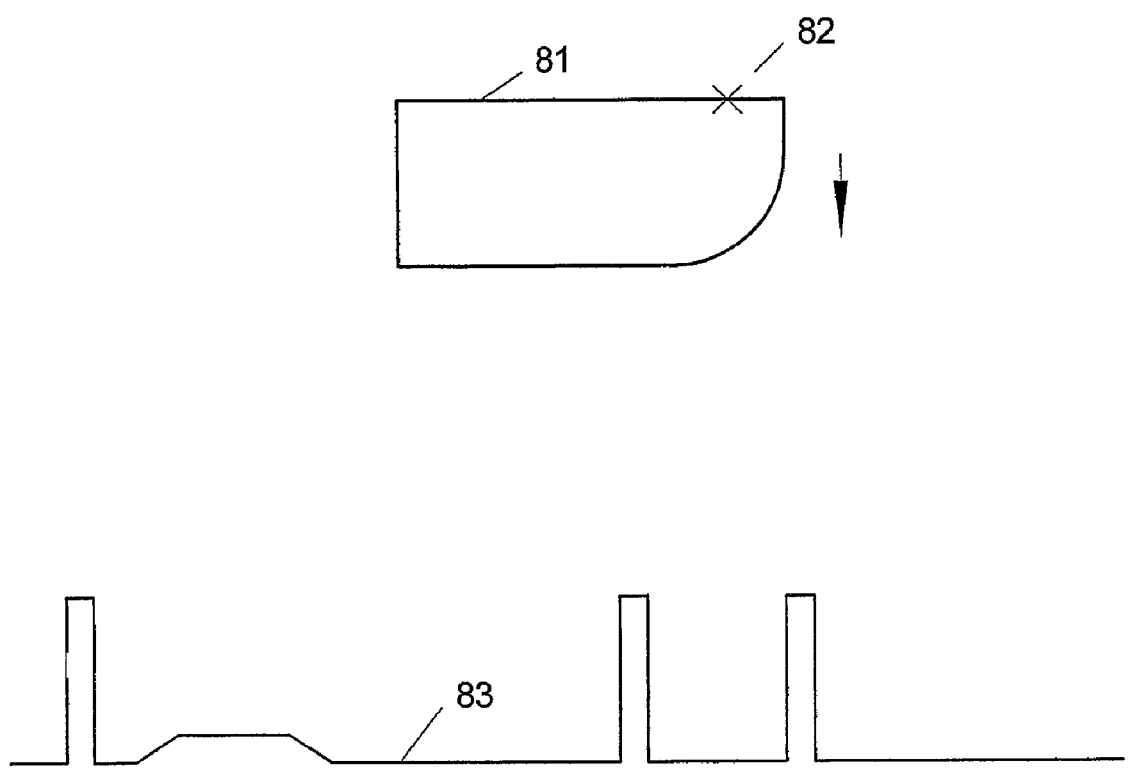
FIG. 5 provides the linear signature for a rectangular object with one rounded corner.

Referring now to FIG. 5, there is shown the development of a linear signature for a rectangle with a rounded corner. Object 81 has its perimeter traced beginning at point 82 and tracing clockwise. Linear signature 83 is developed as a result. Note the flattening of y-axis magnitude representing the arc of the rounded corner.

Figure 6:
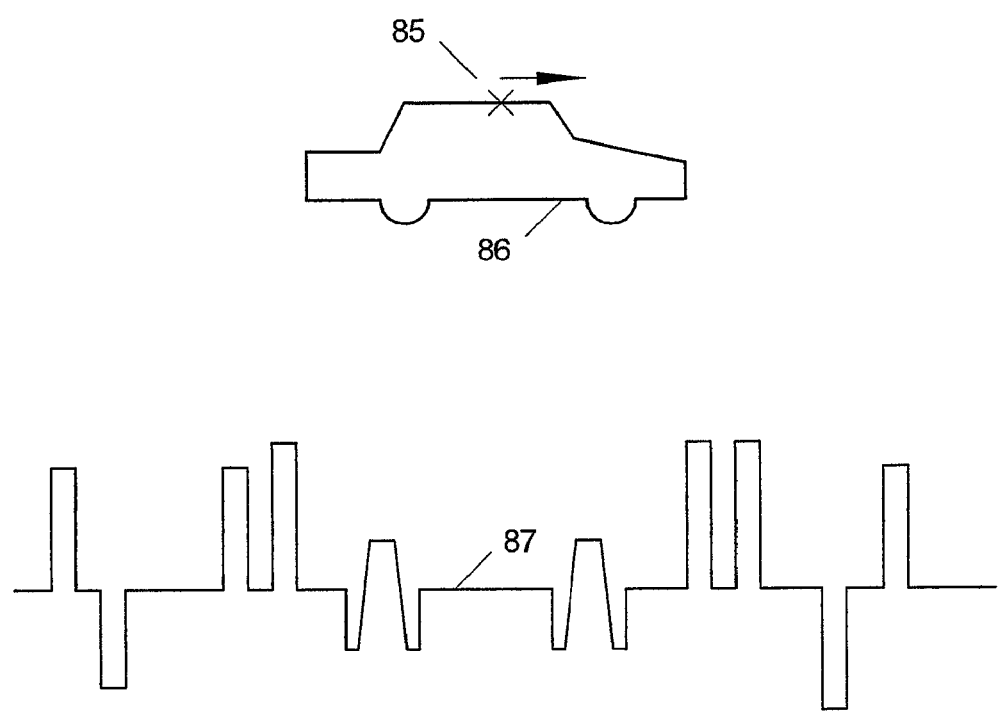
FIG. 6 shows the development of a linear signature for an automobile.

Referring now to FIG. 6, there is shown the development of a linear signature for an automobile. Automobile image 86 has its perimeter traced beginning at point 85 and tracing clockwise. Linear signature 87 is developed as a result. This example shows the result of both negative and positive differential angles. Visible characteristics such as the plotted results for wheels and the relative length of the wheel-base indicate an ability to recognize objects from their linear signature.

Figure 7:
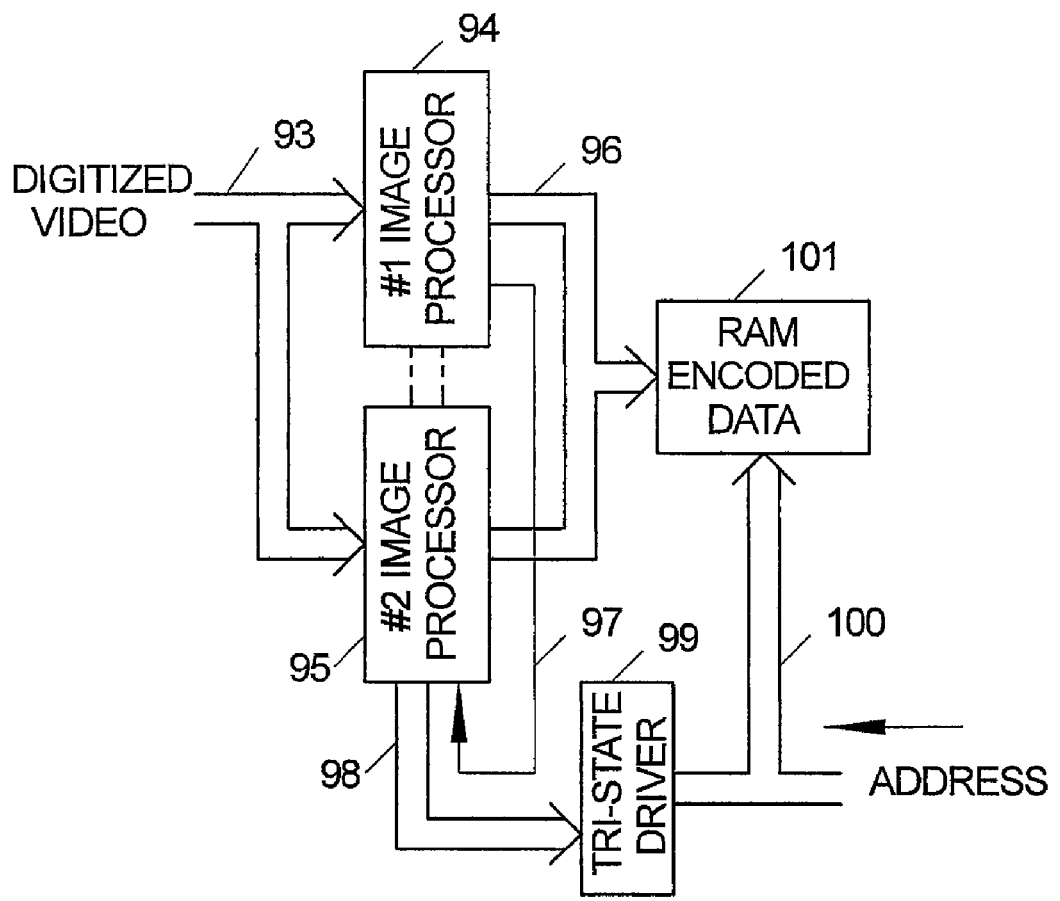
FIG. 7 is a configuration of a dual image processor for enhanced angle data generation.

Referring now to FIG. 7, there is shown a configuration for enhancing the encoded results of the data field stored in RAM using a dual image processor. Digitized video data 93 (same as data 4 of FIG. 1) is applied to both #1 image processor 94 and #2 image processor 95 which each selectively apply their processed outputs data 96 to RAM encoded data 101. The selection of the tri-state output data from one of these processors is determined by #1 image processor 94 with signal 97 to provide tri-state control of #2 image processor 95. When #2 image processor 95 is selected, #1 image processor 94 output remains tri-state. Tri-state driver 99 (same as tri-state driver 11 of FIG. 1) functions to control the address 100 selection to RAM encoded data 101 as previously described. The dual image processors each generate encoded data output with only one having active tri-state output. One processor operates at a very large differential threshold (image contrast before detecting edges and generating data). This condition eliminates minor edge detection (noise). When there is insufficient contrast with the small portion (cell) of image location being processed at a given instant, the second image processor provides output. It operates at a much smaller threshold to detect a weak edge. The output encoding indicates which processor provided the output. Therefore, a much more complete processing can be accomplished.

Figure 8:
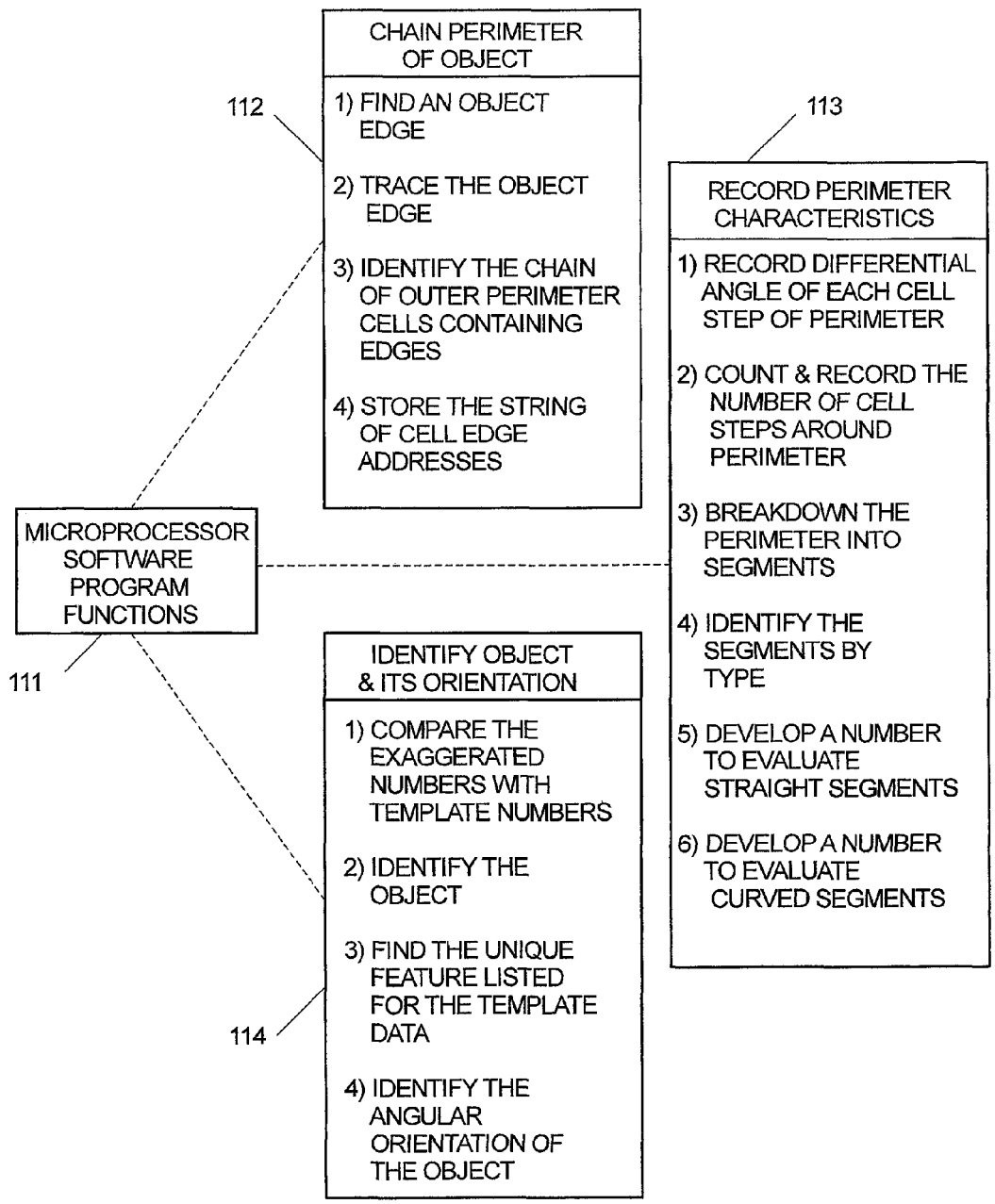
FIG. 8 describes the functions and tasks performed by the microprocessor.

Referring now to FIG. 8, the software program functions and the tasks breakdown for each function are shown. Microprocessor software program functions 111 has three basic functions. The first function is the chain perimeter of object function 112. The tasks listed for this function require reading RAM encoded data 8 of FIG. 1 for encoded data 13. These cell data provide linkage to the next cell in the string of linked cells of the edges of the object being evaluated. The function chains the outer perimeter cells of the object to store a string of cell addresses defining this object boundary. The remaining functions may utilize the reading of angle magnitude 14 of FIG. 1. The second function is the record perimeter characteristics 113. Step 1) is to record the differential angle values for each cell step of the perimeter. These values are proportional to the actual differential angle. Step 2) is to count and record the number of cell steps around the entire object perimeter. Step 3) is to breakdown the perimeter into segments. The segment cell length is recorded. The criteria for segment termination and the beginning of a new segment are as follows. Criterion one requires a differential angle greater than a first predetermined threshold to be detected following a straight (insignificant curvature) segment. Criterion two requires a differential angle measurement less than a second predetermined threshold to be detected following a curved segment. Criterion three requires a reversal of differential angle polarity. Step 4) is to identify the segment type into categories of straight, positive curvature, or negative curvature. It is necessary to normalize each segment length to a value that will be a constant regardless of the scale of the image. To do this, the cell length (of each segment) is divided by the cell count of the perimeter of the object. A template of the object being sought has this common basis. The summation of differential angles of each segment will be the same regardless of scale (provided the perimeter is large enough for evaluation). Step 5) is to develop an exaggerated number, representing the straight segments, to cause a high probability of a unique representation for an object. Step 6) is to develop an exaggerated number, representing the curved segments, to cause a high probability of a unique representation for an object. The third function is to identify the object and its orientation 114. Step 1) is to compare both exaggerated numbers with template numbers for the object being sought. Step 2) is to identify the object based upon favorable comparison of the exaggerated numbers. A template would contain the segment characteristics of the most unique segment of the object. Step 3) is to locate that same segment from the data collected for the object being evaluated. Step 4) is the determination of the angular difference between the unique feature of the template location and the evaluated object location. This will provide the angular displacement between the two and provide the relative orientation of the object.

Referring now to FIG. 9, the data collected for the evaluation of one object are listed in a table. The table represents a software array used to store data. The segment number 121 represents the index number of the array. The number of entries represents the number of cell lengths in the perimeter. The segment length 122 is the cell count of the segment. Summation value 128 is the sum of all entries in the segment length 122 column. The normalized length 123 is the segment length 122 (for that segment) divided by the summation value 128. The segment type 124 is categorized as previously defined. The accumulative curvature 125 is the sum of differential angle measurement of a curved segment (not required for a straight segment). The exaggerated curvature 126 and the exaggerated length 127 are determined as explained in note 6) and note 7) for the table.

While there have been described above the principles of this invention in connection with specific apparatus, it is to be clearly understood that this description is made only by way of example and not as a limitation in the scope of the invention. Various image processing schemes could provide the encoded data utilized or could provide other encoding formats. The method of establishing differential angles could be altered. The span of angle comparison to generate a differential angle is four in the illustrated configuration. This number could be altered without changing the approach. Software processing techniques and functions could be altered. Various chaining approaches could be employed. Other methods of amplifying uniqueness by generating various evaluation numbers could be used. Segment breakdown could conceivably be avoided with the features amplified to provide object identification. Other means of identifying angular orientation could be developed.

What is claimed is:

1. A method for identification of a video image object comprising the steps of:

receiving a first video image from a video device;

digitizing said first video image to generate a second video image;

calculating encoded object edge data segments based on said second video image including the angle tangent to the object edge segments using a digital video processor, wherein said object edge segments makeup an object perimeter;

calculating angular rate of change data based on said object perimeter;

matching said angular rate of change data to one of a plurality of known object templates to identify an object.

2. The method of claim 1, wherein angular rate of change data is a recognizable linear signature of an object when its perimeter is traced.

* * * * *